United States Patent [19]
Ueno et al.

[11] Patent Number: 5,170,354
[45] Date of Patent: Dec. 8, 1992

[54] VEHICULAR TRAVELING DIRECTION MEASURING SYSTEM WITH AUTOMATIC CENTER COORDINATE POSITION CORRECTION

[75] Inventors: Hiroshi Ueno; Kenji Takano, both of Yokosuka, Japan

[73] Assignee: Nissan Motor Company, Ltd., Kanagawa, Japan

[21] Appl. No.: 552,743

[22] Filed: Jul. 16, 1990

[30] Foreign Application Priority Data

Jul. 17, 1989 [JP] Japan .................. 1-184260

[51] Int. Cl.$^5$ ............................................. G01C 17/38
[52] U.S. Cl. .................... 364/449; 364/453; 364/571.05; 33/356
[58] Field of Search .......... 364/449, 453, 454, 571.01, 364/571.02, 571.03, 571.04, 571.05, 457; 33/320, 356, 357, 355 R, 361

[56] References Cited

U.S. PATENT DOCUMENTS

| | | | |
|---|---|---|---|
| 4,497,034 | 1/1985 | Kuno | 364/571.04 |
| 4,611,293 | 9/1986 | Hatch et al. | 364/571.03 |
| 4,660,161 | 4/1987 | Okada | 364/457 X |
| 4,686,772 | 8/1987 | Sobel | 33/356 X |
| 4,738,031 | 4/1988 | Alberter et al. | 33/356 |
| 4,750,349 | 6/1988 | Luitje | 364/559 X |
| 4,751,783 | 6/1988 | Ina et al. | 33/361 |
| 4,767,988 | 8/1988 | Wilson | 33/355 R X |
| 4,771,547 | 9/1988 | Akatsu et al. | 33/356 |
| 4,791,574 | 12/1988 | Thoone et al. | 364/450 X |
| 4,797,841 | 1/1989 | Hatch | 364/571.04 |
| 4,841,449 | 6/1989 | Suyama | 364/571.04 X |
| 4,852,012 | 7/1989 | Suyama | 364/571.02 X |
| 4,862,398 | 8/1989 | Shimuzu et al. | 364/457 X |
| 4,866,627 | 9/1989 | Suyama | 364/457 |
| 4,870,602 | 9/1989 | Baumker | 364/571.02 |
| 4,972,593 | 11/1990 | Dahlen et al. | 33/356 |
| 4,989,333 | 2/1991 | Helldörfer et al. | 33/356 |
| 5,023,799 | 6/1991 | Nakayama et al. | 364/449 |
| 5,117,375 | 5/1992 | Worcester et al. | 364/571.01 |

*Primary Examiner*—Parshotam S. Lall
*Assistant Examiner*—Thomas S. Auchterlonie
*Attorney, Agent, or Firm*—Lowe, Price, LeBlanc & Becker

[57] ABSTRACT

A ststem measures a traveling direction of a vehicle based on a direction toward a coordinate position defined by output data from a geomagnetic direction sensor from a first coordinate position of a center of a corresponding output circle. The system utilizes a preliminary coordinate position as a preliminary corrected value of the first center coordinate position and a correction value indicative of reliability of the preliminary center coordinate position for deriving a finally corrected value of the first center coordinate position. The reliability of the preliminary center coordinate position is derived from previously stored data in terms of a derived variation in a vehicular traveling direction. The system derives the finally corrected value of the first center coordinate position based on the preliminary center coordinate position and the correction value such that the finally corrected value is derived closer to the preliminary center coordinate position when the correction value is derived larger.

16 Claims, 9 Drawing Sheets

VEHICULAR TRAVELING DIRECTION MEASURING SYSTEM WITH AUTOMATIC CENTER COORDINATE POSITION CORRECTION

BACKGROUND OF THE INVENTION

1. Field of the Invention

This invention relates generally to a system for measuring a traveling direction of a vehicle using a geomagnetic direction sensor and, more specifically, to a vehicular traveling direction measuring system which is capable of providing an accurate measurement of a traveling direction of the vehicle even when a vehicle body is magnetized.

2. Description of the Background Art

One of previously proposed systems for measuring a vehicle traveling direction is exemplified by, such as, Japanese First Patent Publication No. 59-100812 published on Jun. 11, 1984.

In the system of this publication, a geomagnetic direction sensor is used for measuring the traveling direction of the vehicle. The geomagnetic direction sensor has a pair of windings which are intersected in perpendicular to each other and arranged on an annular core in a horizontal posture. The geomagnetic direction sensor outputs detected voltages (output values) corresponding to geometric directional components interlinked to the respective windings.

When the vehicle makes one turn under the uniform geomagnetism, an output circle is described on a coordinate plane using coordinate positions each defined by the voltages detected at the respective windings. Accordingly, during a normal traveling of the vehicle, a direction from a center of the output circle toward a coordinate position defined by the detected voltages is derived as a traveling direction of the vehicle.

On the other hand, when the vehicle body is magnetized or when a magnetization level on the vehicle body is changed due to the disturbance of the environmental geomagnetism, the center of the output circle is caused to vary or move, thus resulting in an error in measurement of the traveling direction of the vehicle. To correct this error, one turn of the vehicle is required to derive a new center of a corresponding output circle. Specifically, the output values of the geomagnetic direction sensor are sampled during one turn of the vehicle and then averaged to derive a new or corrected center of the output circle.

In the foregoing background art, however, because a small number of the output values are sampled to be averaged even when the magnetic environment is not preferable, it is substantially impossible to derive a corrected center coordinate position of a corresponding output circle with high accuracy. Further, one turn of the vehicle has to be performed by a driver for the correction.

Still further, although it is desirable to make one turn of the vehicle as soon as possible after the vehicle body is magnetized, it is practically difficult to seek a proper place for making the vehicle turn. Accordingly, the direction measurement error remains during the traveling of the vehicle until finding the proper place for making the vehicle turn.

Further, when the foregoing correction of the center of the output circle is performed in the condition of the large disturbance of the environmental geomagnetism, such as, on a road under a high level road or among high buildings, the correction accuracy becomes less in comparison with the correction accuracy performed in the condition of smaller disturbance of the geomagnetism. Accordingly, the corrected coordinate position of the center of the output circle tends to be unreliable so that the correction itself becomes meaningless.

SUMMARY OF THE INVENTION

Therefore, it is an object of the present invention to provide a system for measuring a traveling direction of a vehicle that can eliminate the above-noted defects inherent in the background art.

It is another object of the present invention to provide a system for measuring a traveling direction of a vehicle that can provide an accurate measurement of a traveling direction of the vehicle by correcting a coordinate position of a center of an output circle with high accuracy, but without requiring a vehicle driver to make any turn of the vehicle, regardless of the condition of the disturbance of the environmental geomagnetism around the vehicle.

To accomplish the above-mentioned and other objects, according to one aspect of the present invention, a system comprises:

geomagnetic sensor means for sequentially deriving a set of two directional component data of the geomagnetism around a vehicle, the two directions being orithogonal to each other on a horizontal plane to define a first coordinate position by each set of the two directional component data;

first means for deriving a variation in a traveling direction of the vehicle;

second means for deriving a second coordinate position of a center of a corresponding output circle based on the first coordinate positions;

third means for deriving a correction value indicative of reliability of the second center coordinate position based on previously stored data, the reliability being derived in terms of the derived directional variation from the previously stored data;

fourth means for deriving a third center coordinate position as a correction value of the second center coordinate position based on the second center coordinate position and the reliability indicative correction value such that the third center coordinate position is derived closer to the second center coordinate position when the reliability indicative correction value is derived larger;

fifth means for deriving a traveling direction of the vehicle based on a direction from the third center coordinate position toward the first coordinate position defined by an instantaneous set of the two directional component data.

According to another aspect of the present invention, a system comprises:

goemagnetic sensor means for sequentially deriving two directional component data of the geomagnetism around a vehicle, the two directions being orithogonal to each other on a horizontal plane;

first means for deriving a traveling direction of the vehicle based on a direction toward a coordinate position defined by the two directional component data from a first coordinate position of a center of a corresponding output circle;

second means for deriving a variation in a traveling direction of the vehicle;

third means for deriving a second coordinate position as a preliminarily corrected value of the first coordinate position based on the sequentially derived two directional component data;

fourth means for deriving a correction value indicative of reliability of the second center coordinate position based on previously stored data, the reliability being derived in terms of the derived directional variation from the previously stored data;

fifth means for deriving a third coordinate position as a finally corrected value of the first coordinate position based on the second coordinate position and the reliability indicative correction value such that the third coordinate position is derived closer to the second coordinate position when the reliability indicative correction value is derived larger.

According to a further aspect of the present invention, a system comprises:

geomagnetic sensor means for sequentially deriving a set of two directional component data of the geomagnetism around a vehicle, the two directions being orithogonal to each other on a horizontal plane to define a first coordinate position by each set of the two directional component data;

first means for deriving a first variation in a traveling direction of the vehicle based on data output from a non-geomagnetic direction sensor, the non-geomagnetic direction sensor outputting the data without being affected by the geomagnetism around the vehicle;

second means for deriving a second coordinate position of a center of a corresponding output circle based on the first coordinate positions when the first directional variation is no less than a first predetermined value;

third means for deriving a third coordinate position of a center of a corresponding output circle based on the first coordinate positions and the first directional variation when the first directional variation is less than the first predetermined value;

fourth means for deriving a second variation in a traveling direction of the vehicle based on the first coordinate positions;

fifth means for deriving a first correction value indicative of first reliability of the second center coordinate position based on previously stored first data, the first reliability being derived in terms of the second derived directional variation from the first previously stored data;

sixth means for deriving a second correction value indicative of second reliability of the third center coordinate position based on previously stored second data, the second reliability being derived in terms of the first derived directional variation from the second previously stored data;

seventh means for deriving a fourth center coordinate position as a correction value of the second or third center coordinate position based on the second or third center coordinate position and the first or second reliability indicative correction value, respectively, such that the fourth center coordinate position is derived closer to the second or third center coordinate position when the corrsponding first or second reliability indicative correction value is derived larger;

eighth means for deriving a traveling direction of the vehicle based on a direction from the fourth center coordinate position toward the first coordinate position defined by an instantaneous set of the two directional component data.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

Figure 1:
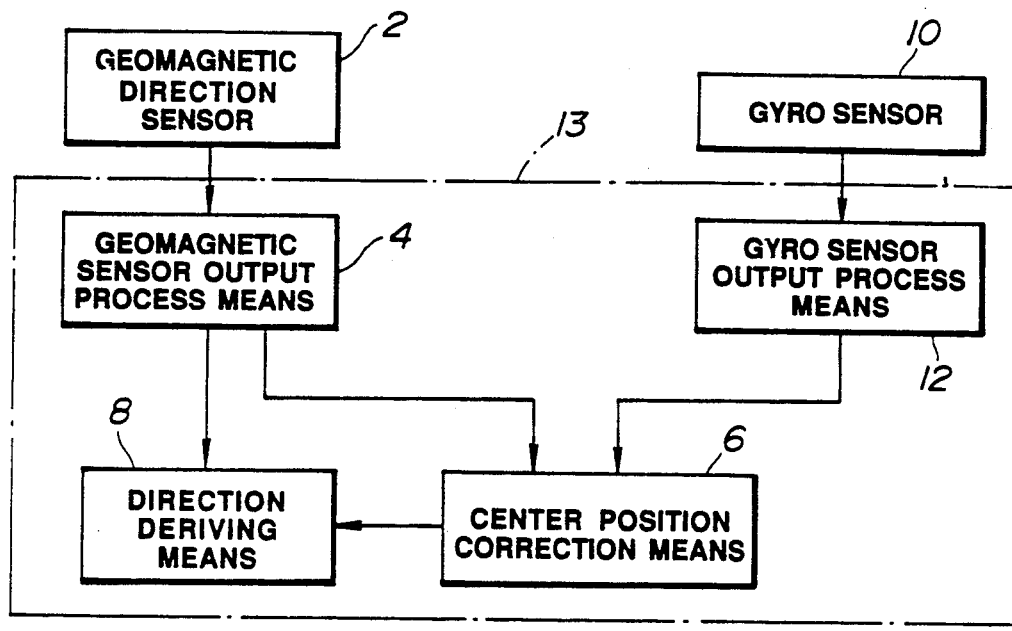
FIG. 1 is a schematic block diagram showing a preferred embodiment of the present invention.

Referring now to the drawings, a preferred embodiment of a vehicular traveling direction measuring system according to the present invention will be described with reference to FIGS. 1 to 15(B).

FIG. 1 shows a functional block diagram of the vehicular traveling direction measuring system of the preferred embodiment for schematically explaining the general concepts thereof. In FIG. 1; the geomagnetic direction sensor 2, preferably of a flux gate type, resolves the geomagnetism into two directional components, the two directions being perpendicular to each other on a horizontal plane, and outputs the two directional component data in the form of electrical signals (Vx, Vy) indicative of a coordinate position on an X-Y coordinate plane. The outputs of the geomagnetic direction sensor 2 are converted into digital signals through geomagnetic sensor output process means 4 to be fed to center coordinate position correction means 6 as well as to vehicular traveling direction deriving means 8. The direction deriving means 8 sequentially derives a traveling direction of the vehicle based on a direction toward a coordinate position defined by the two directional component date of the geomagnetic direction sensor 2 through the process means 4 from a center coordinate position corrected by the correction means 6.

A gyro sensor 10 outputs a signal indicative of an angular velocity $\omega_G$ in a yawing direction of the vehicle. The gyro sensor 10 is replaceable by, such as, a steering angle sensor and a speed differential sensor which derives a difference in speed between right and left side wheels, as long as its output is not affected by the geomagnetic environment. The output signals of the gyro sensor 10 are converted into digital signals through gyro sensor output process means 12. The gyro sensor output process means 12 derives a variation $\Delta\theta_G$ in the vehicular traveling direction by integration of the angular velocity $\omega_G$, and further derives a gyro direction $\theta_G$ of the traveling vehicle based on the following equation (1).

$$\theta_G = \theta_{GOLD} + \Delta\theta_G \quad (1)$$

wherein, $\theta_{GOLD}$ is a prior value of $\theta_G$.

The outputs from the gyro sensor output process means 12 are fed to the center coordinate position correction means 6. The center coordinate position correction means 6 derives a corrected center coordinate position based on the signals input from the geomagnetic direction sensor 2 through the process means 4 and from the gyro sensor 10 through the process means 12 and further based on preset data stored in store means 7 to be fed to the vehicular direction deriving means 8.

The process means 4 and 12, the center coordinate position correction means 6 and the direction deriving means 8 form a control unit 13.

Figure 2:
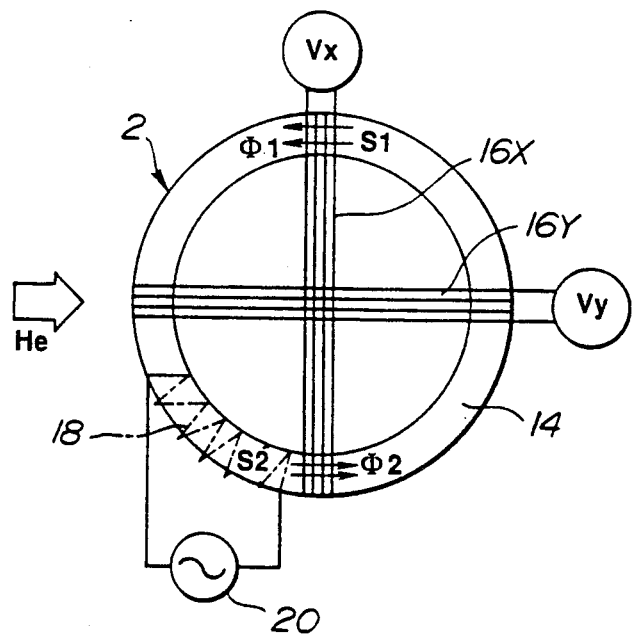
FIG. 2 is a schematic circuit wiring diagram of a geomagnetic direction sensor used in the preferred embodiment of FIG. 1.
Figure 3:
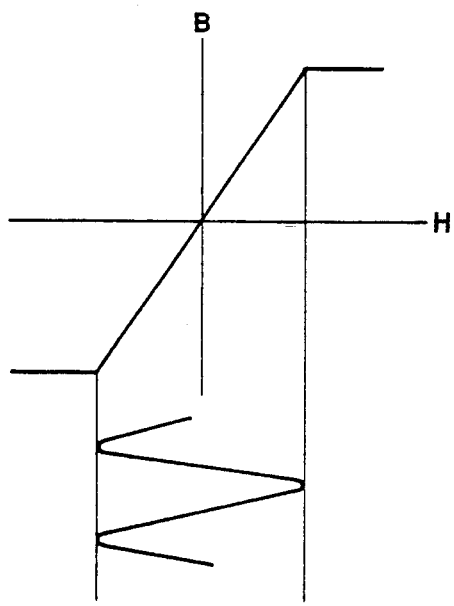
FIG. 3 is a graph of magnetic flux density B versus magnetic field H showing characteristics of energization of the geomagnetic direction sensor of FIG. 2.

FIG. 2 shows a structure of the geomagnetic direction sensor 2 used in the preferred embodiment. The geomagnetic direction sensor 2 includes an annular magnetic core 14 made of a permalloy and a pair of windings 16X and 16Y wound on the magnetic core 14. The windings 16X and 16Y are arranged in perpendicular to each other. Further, a winding 18 is wound on the magnetic core 14. The winding 18 is energized by a power supply 20 so as to energize the magnetic core 14 immediately before saturation as shown in FIG. 3.

Figure 4:
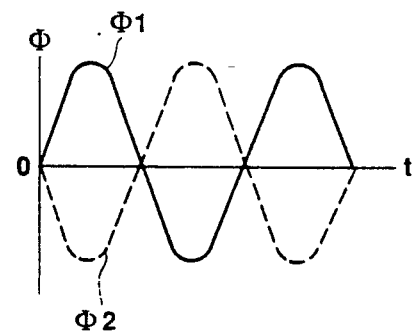
FIG. 4 is a graph of time versus magnetic flux showing a variation in magnetic flux on a permalloy core of the geomagnetic direction sensor under no application of the magnetic field.

When the geomagnetic direction sensor 2 is placed in a non-magnetic field with the power supplied to the winding 18, a magnetic flux $\phi_1$ and a magnetic flux $\phi_2$ passing through positions $S_1$ and $S_2$ of the permalloy core 14, respectively, have the same magnitudes but run in opposite directions to each other (180° out of phase with each other), as shown in FIG. 4. Accordingly, as the magnetic flux interlinked to the winding 16X becomes zero, its detecting voltage expressed by $Vx$——$N\, d\phi/dt$ (N denotes the number of turns of the winding), also becomes zero, and similarly, a detecting voltage Vy of the winding 16Y also becomes zero.

Figure 5:
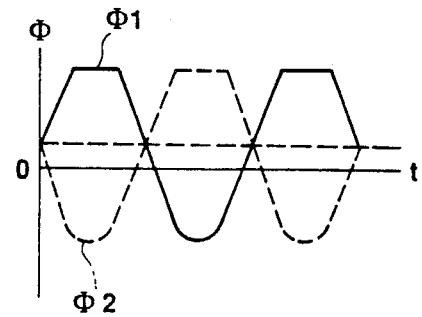
FIG. 5 is a graph of time versus magnetic flux showing a variation in magnetic flux on a permalloy core of the geomagnetic direction sensor under application of the magnetic field.
Figure 6:
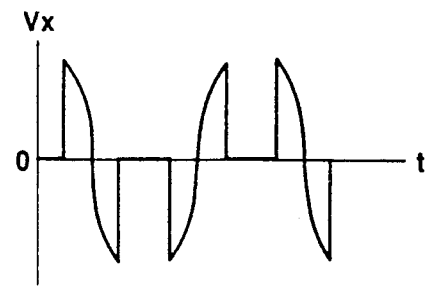
FIG. 6 is a graph of time versus detected voltage showing characteristics of the detected voltages.

Further, when the geomagnetic filed He is applied in perpendicular to the winding 16X as shown in FIG. 2, a bias of the geomagnetic flux density expressed as $Be = \mu\, He$ ($\mu$ denotes a permeability of the permalloy core) is given to the magnetic flux in the magnetic core 14. Accordingly, the magnetic flux $\phi_1$ and $\phi_2$ becomes asymmetrical as shown in FIG. 5, so that the winding 16X derives the detecting voltage Vx of a waveform as shown in FIG. 6.

On the other hand, because the geomagnetic field He is parallel to the winding 16Y in FIG. 2, no geomagnetic field is interlinked with the winding 16Y so that no voltage Vy is generated in the winding 16Y.

Figure 7:
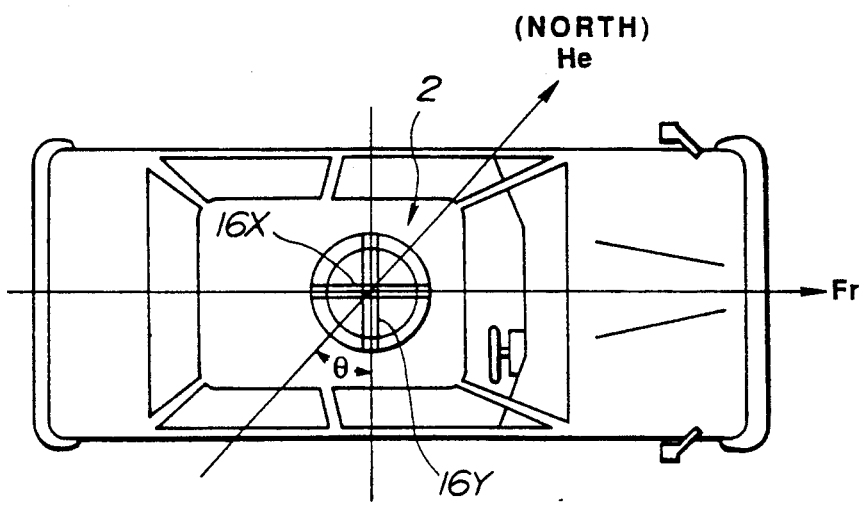
FIG. 7 is a schematic plan view of a vehicle incorporated with the geomagnetic direction sensor of FIG. 2 to explain a traveling direction of the vehicle.
Figure 8:
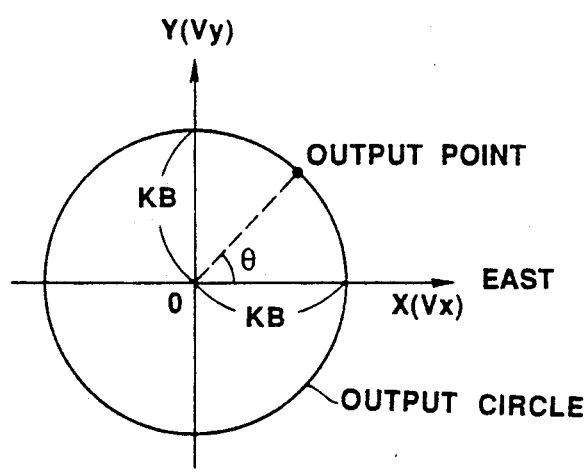
FIG. 8 is an explanatory view of an output circle derived by outputs of the geomagnetic direction sensor.

The geomagnetic direction sensor 2 is mounted on the vehicle in a horizontal posture as shown in FIG. 7. For example, when the geomagnetic field He is applied to both of the windings 16X and 16Y, the detected voltages Vx and Vy (output values) are respectively derived at the windings 16X and 16Y according to the geomagnetic field, as shown in FIG. 8.

The detected voltages Vx, Vy are expressed by the following equations (2) and (3) provided that a value K is a winding constant and a value B is a horizontal component of the geomagnetism He.

$$Vx = KB \cos\theta \quad (2)$$

$$Vy = KB \sin\theta \quad (3)$$

Accordingly, an angle $\theta$ of a traveling direction of the vehicle with respect to a width direction of the vehicle body is expressed by the following equation (4).

$$\theta = \tan^{-1}(Vx/Vy) \quad (4)$$

As appreciated from the equations (2) and (3), when the vehicle makes one turn under the uniform geomagnetic field He, an output circle is described on the X-Y coordinate plane based on coordinate positions each defined by the detected voltages Vx and Vy, as shown in FIG. 8. The output circle is expressed by the following equation (5).

$$Vx^2 + Vy^2 = (KB)^2 \quad (5)$$

Accordingly, because the coordinate position defined by the detected voltages Vx, Vy falls on the output circle, a direction from the center O of the output circle toward the coordinate position (an output point shown in FIG. 8) is derived by the vehicular traveling direction deriving means 8, i.e. the control unit 13 as a traveling direction of the vehicle.

Figure 9:
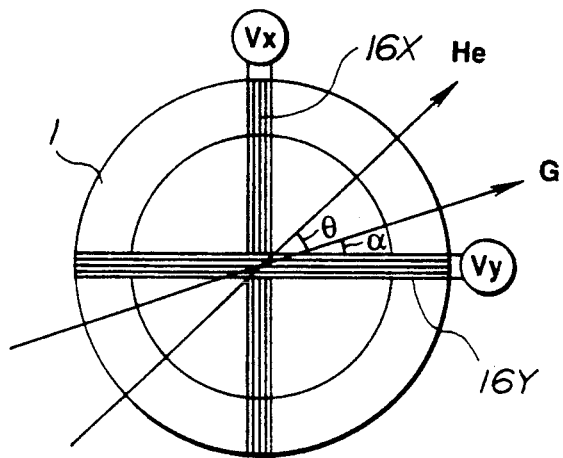
FIG. 9 is an explanatory view showing the geomagnetic direction sensor, wherein a magnetic field other than the geomagnetic field is applied to the geomagnetic direction sensor in addition to the geomagnetic field.
Figure 10:
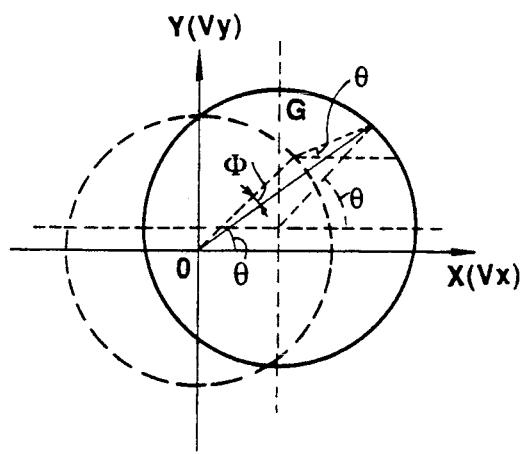
FIG. 10 is an explanatory view showing a displacement of the output circle due to magnetization on the vehicle body.

Assuming that the vehicle is magnetized, an additional magnetic field G is generated and interlinked with the windings 16X, 16Y along with the geomagnetism He, as shown in FIG. 9. Accordingly, the output circle is moved from a broken line position to a solid line position, as shown in FIG. 10. Consequently, the traveling direction of the vehicle derived by the control unit 13 inevitably includes an error because a coordinate position derived after the magnetization on the vehicle body does not fall on the output circle derived before the vehicle magnetization.

In order to correct the above-noted measurement error, the control unit 13 executes a below-described process (corresponding to the center coordinate position correction means 6) for deriving a corrected coordinate position of the center of a corresponding output circle.

Figure 11:
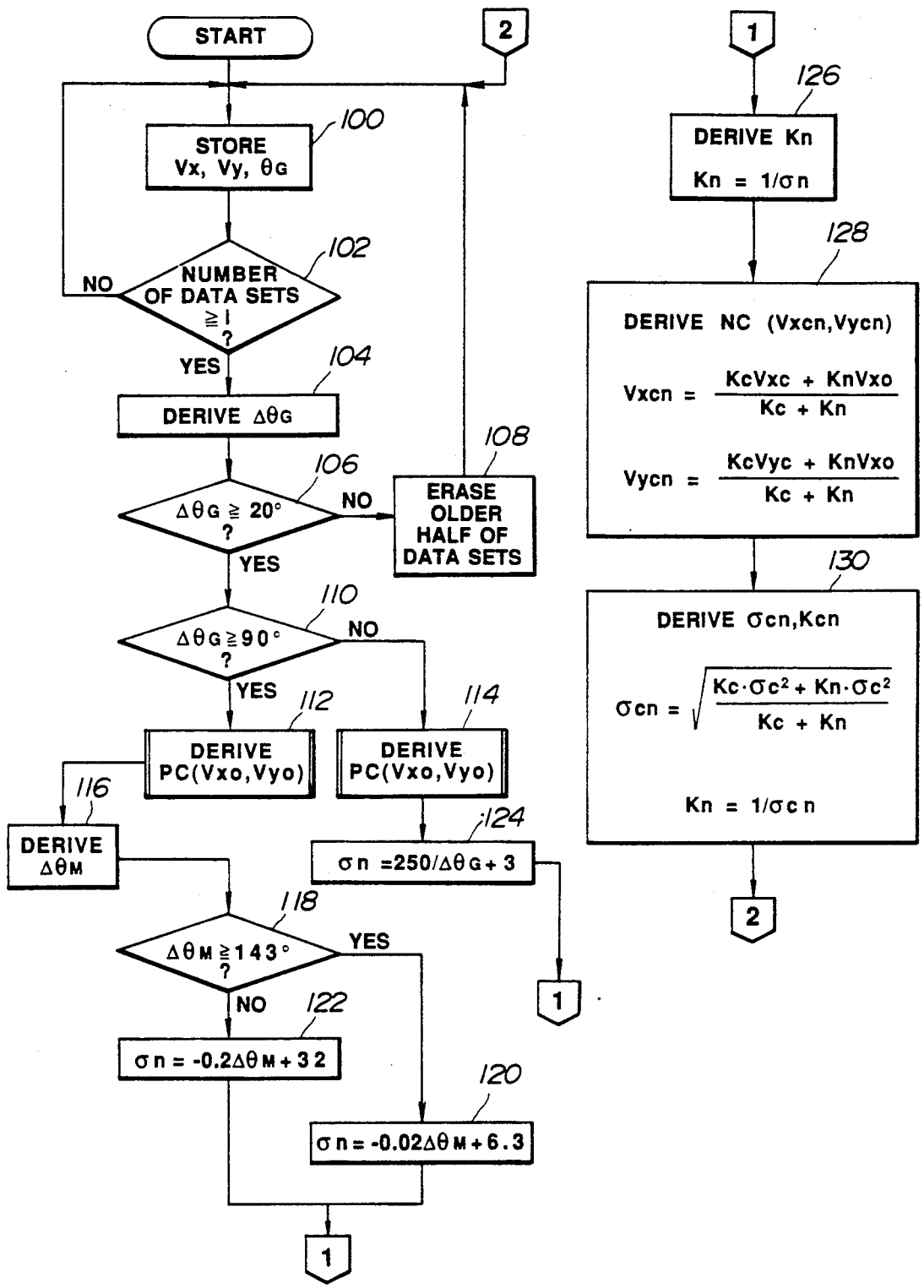
FIG. 11 is a flowchart of a main routine to be executed by a control unit in the preferred embodiment of FIG. 1 for deriving a new or corrected center coordinate position of a corresponding output circle.

FIG. 11 shows a flowchart of a main routine to be executed by the control unit 13 for deriving a corrected center coordinate position of a corresponding output circle.

At a first step 100, the output values Vx and Vy sequentially fed from the geomagnetic direction sensor 2 as well as the gyro direction $\theta_G$ are stored. The gyro direction $\theta_G$ is derived based on the output data from the gyro sensor 10 through an interrupt routine (corresponding to the gyro sensor output process means 12) which is executed per a predetermined unit time $\Delta T$. The output values Vx, Vy and the gyro direction $\theta_G$ form one set of the input data.

Subsequently, at a step 102, it is decided whether the number of the sets of the input data becomes no less than a predetermined value i. If a decision at the step 102 is NO, i.e. the number is still less than the predetermined value i, the routine goes back to the step 100 to further store the data until the number becomes no less than the predetermined value i. The step 102 is provided for avoiding execution of the center coordinate position correction without new data enough for the execution thereof.

On the other hand, if the decision at the step 102 is YES, then the routine proceeds to a step 104 where a variation $\Delta\theta_G$ of a vehicular traveling direction is derived by the following equation (6).

$$\Delta\theta_G = \theta_{Gi} - \theta_{G1} \quad (6)$$

wherein, $\theta_{Gi}$ is a newest value of $\theta_G$ stored at the step 100 and $\theta_{G1}$ is an oldest value of $\theta_G$ stored at the step 100.

It is to be appreciated that $\theta_{G1}$ may be one of the stored $\theta_G$ which has a maximum angular difference from $\theta_{Gi}$. Alternatively, it may be possible that $\Delta\theta_G$ is sequentially stored at the step 100 in place of $\theta_G$ to derive $\Delta\theta_G$ at the step 104 by accumulating the stored $\Delta\theta_G$.

Subsequently, at a step 106, it is decided whether $\Delta\theta_G$ derived at the step 104 is no less than a value 20°. If a decision at the step 106 is NO, i.e. $\Delta\theta_G$ is less than the value 20°, then the routine goes to a step 108 where an older half of the stored $\theta_G$ is erased. Subsequently, the routine goes back to repeat the steps 100 to 106 until $\Delta\theta_G$ derived at the step 104 becomes no less than the value 20°. The step 108 is provided for avoiding execution of the subsequent correction of the center coordinate position similar to the step 102 since no substantial variation in the vehicular traveling direction happens even when the number of the data sets becomes no less than the predetermined value i.

It is to be appreciated that the variation in the vehicular traveling direction is derived based on the output data from the gyro sensor 10 in this preferred embodiment. This is because, although the traveling direction obtained by the output data from the gyro sensor 10 includes a substantial error on a long-term basis due to a drift, it is considered to be accurate on a short-term basis in comparison with that derived by the output data from the geomagnetic direction sensor 2, particularly when the environmental geomagnetism around the vehicle is not preferable. Accordingly, the variation in the traveling direction derived by the equation (6) ($\Delta\theta_G = \theta_{Gi} - \theta_{G1}$) is considered to be accurate.

Referring back to the step 106, if the decision at the step 106 is YES, i.e. the directional variation $\Delta\theta_G$ derived at the step 104 is no less than the predetermined value of 20°, then the routine proceeds to a step 110 where it is decided whether the directional variation $\Delta\theta_G$ derived at the step 104 is no less than a predetermined value of 90°. If a decision at the step 110 is YES, i.e. the directional variation $\Delta\theta_G$ is no less than 90°, then the routine goes to a step 112 where a preliminary center coordinate position PC of a corresponding output circle is derived based on a subroutine (1) of FIG. 12. On the other hand, if the decision at the step is NO, i.e. the directional variation $\Delta\theta_G$ is less than 90°, then the routine goes to a step 114 where a preliminary center coordinate position PC of a corresponding output circle is derived based on a subroutine (2) of FIG. 13.

Figure 12:
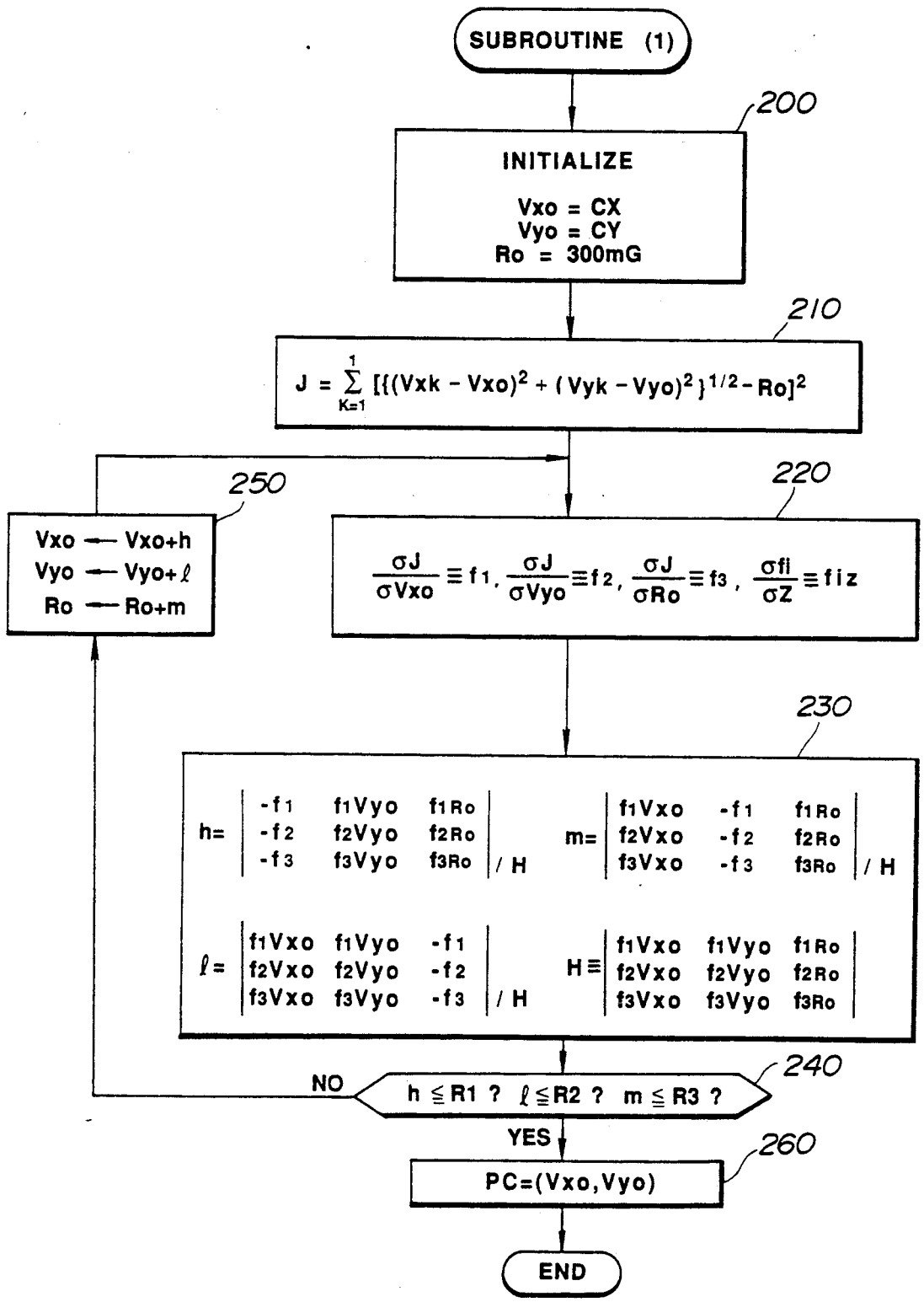
FIG. 12 is a flowchart showing a subroutine for deriving a preliminary center coordinate position when a derived directional variation is no less than a predetermined value.

In the subroutine (1) of FIG. 12, at a first step 200, Vxo and Vyo are respectively initialized to Cx and Cy. Cx and Cy are virtual X and Y coordinate values of a center of an output circle derived by the data Vx and Vy which are stored at the step 100, based on a premise that a circle is described by the stored data Vx and Vy.

For example, Cx and Cy are derived by the following equation.

$$Cx = \sum_{k=1}^{i} Vxk/i$$

$$Cy = \sum_{k=1}^{i} Vyk/i$$

wherein, i denotes the number of Vx and Vy, respectively, stored at the step 100.

At the first step 200, a virtual radius Ro of the output circle having its center value of Vxo and Vyo, is also initialized to 300 mG (milligauss) which is an average output value of the geomagnetism.

Through subsequent steps 210 to 260, the preliminary center coordinate position PC is calculated using the method of least squares.

Specifically, a distance Ri between the virtual center coordinate position (Vxo, Vyo) and a coordinate position (Vxi, Vyi) is calculated by the following equation (7).

$$Ri = (\{Vxi - Vxo\}^2 + \{Vyi - Vyo\}^2)^{\frac{1}{2}} \quad (7)$$

Accordingly, a value J according to the method of least squares is derived by an equation which is shown at the step 210.

According to the method of least squares, by deriving values of Vxo, Vyo and Ro which make the value J the least, the corrected values of Cx and Cy can be obtained.

At the subsequent step 220, partial derivatives of J with respect to Vxo, Vyo and Ro are respectively derived.

In order to derive the values of Vxo, Vyo and Ro which render the value J the least, the following condition should be satisfied.

$$f1 = \frac{\delta J}{\delta Vxo} = \quad (8)$$

$$\Sigma \left( 1 - \frac{Ro}{\sqrt{(Vxi - Vxo)^2 + (Vyi - Vyo)^2}} \right) \times (Vxi - Vxo) = 0$$

$$f2 = \frac{\delta J}{\delta Vyo} = \quad (9)$$

$$\Sigma \left( 1 - \frac{Ro}{\sqrt{(Vxi - Vxo)^2 + (Vyi - Vyo)^2}} \right) \times (Vyi - Vyo) = 0$$

$$f3 = \frac{\delta J}{\delta Ro} \quad (10)$$

$$= \Sigma \{ \sqrt{(Vxi - Vxo)^2 + (Vyi - Vyo)^2} - Ro \} = 0$$

By deriving values of Vxo, Vyo and Ro which satisfy the equations (8), (9) and (10), a coordinate position defined by the derived Vxo and Vyo becomes the corrected preliminary center position PC.

However, it is impossible to derive the values of Vxo, Vyo and Ro which satisfy the equations (8), (9) and (10). In view of this, the present preferred embodiment utilizes Newton-Raphson's method at the step 230. At the step 230, correction values h, m and l are derived by equations which are shown at the step 230, wherein giz=δ gi/δ z.

At the subsequent step 240, the correction values are compared with predetermined reference values R1, R2 and R3, respectively. If a decision at the step 240 is YES, i.e. all the correction values are no more than the corresponding reference values, then the X and Y coordinate values Vxo and Vyo derived at the step 200 are set as the corrected preliminary center position PC at the step 260.

On the other hand, if any one of the three correction values is decided above the corresponding reference value at the step 240, the correction value h is added to Vxo, the correction value l is added to Vyo, and the correction value m is added to Ro at the step 250. In this case, the steps 220 to 240 are repeated until each of the correction values becomes no more than the corresponding reference value.

The details of deriving the preliminary center coordinate position PC is disclosed in Japanese First Utility Model Publication No. 1-144814 published on Oct. 4, 1989, the contents of which are incorporated hereby by reference for the sake of disclosure.

Figure 13:
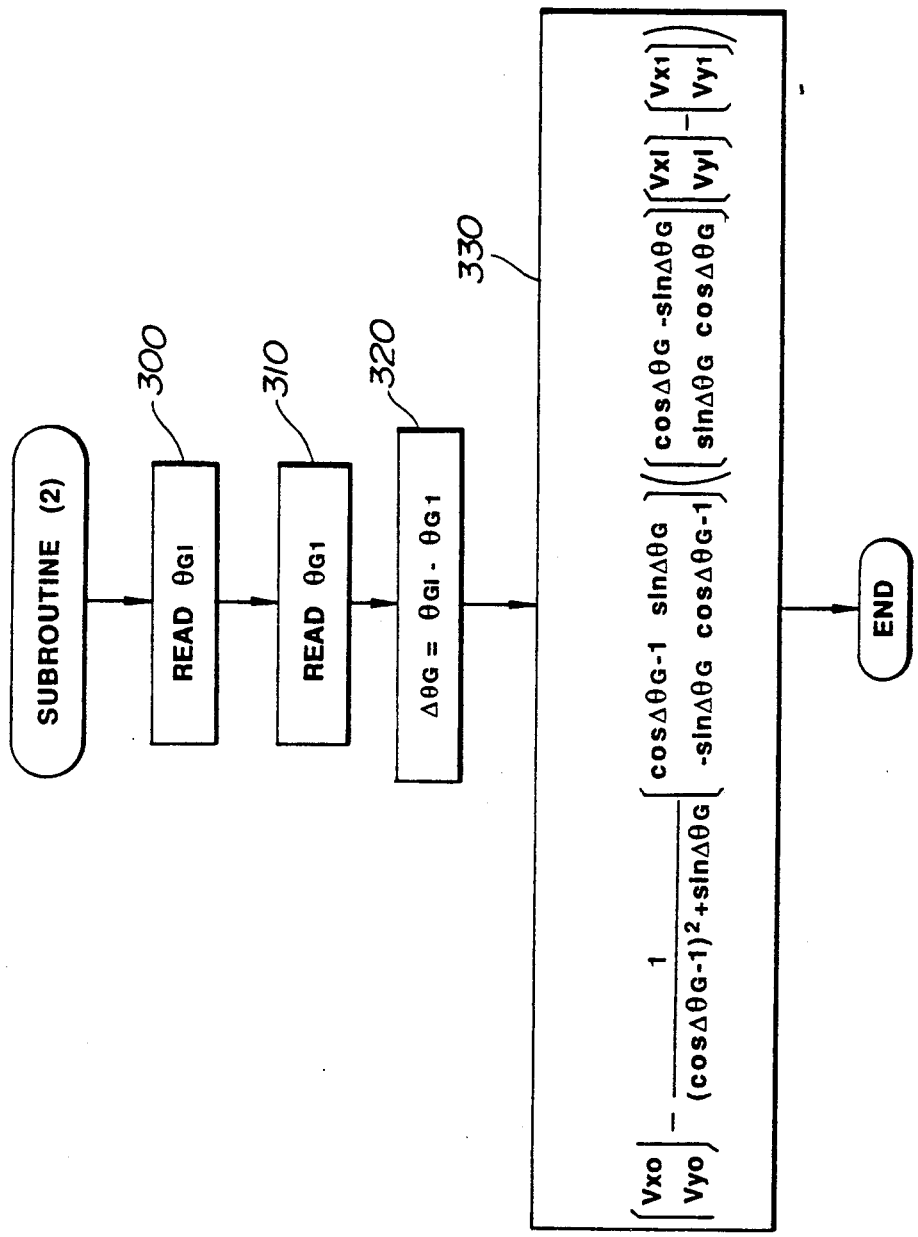
FIG. 13 is a flowchart showing a subroutine for deriving a preliminary center coordinate position when the derived directional variation is less than the predetermined value.

In the subroutine (2) of FIG. 13, at a first step 300, the gyro direction $\theta_{Gi}$ is read out. The gyro direction $\theta_{Gi}$ is the newest value of $\theta_G$ stored at the step 100. Subsequently, the routine goes to a step 310 where the gyro direction $\theta_{Gl}$ is read out. The gyro direction $\theta_{Gl}$ is the oldest value of $\theta_G$ stored at the step 100.

It is to be appreciated that $\theta_{Gl}$ may be one of the stored $\theta_G$ which has a maximum angular difference from $\theta_{Gi}$.

At a subsequent step 320, a directional variation $\Delta\theta_G$ is derived by an equation $\Delta\theta_G = \theta_{Gi} - \theta_{Gl}$.

It is to be appreciated that $\Delta\theta_G$ derived at the step 104 may be directly read out at the step 320, and the steps 300 and 310 may be omitted.

The preliminary center coordinate position PC can be derived in the following way.

Figure 14:
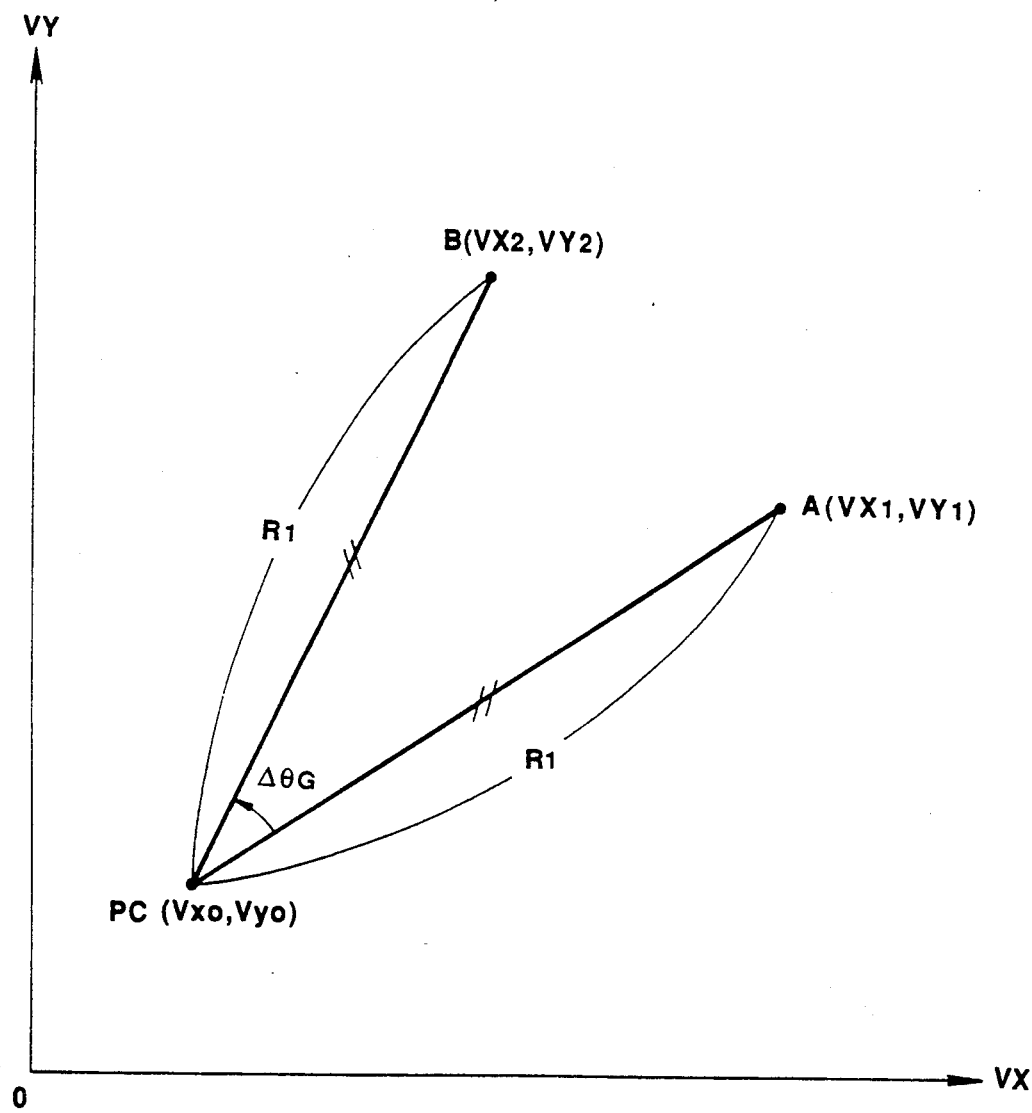
FIG. 14 is a graph showing a Vx-Vy coordinate plane for explaining concepts for deriving a preliminary center coordinate position using the method of isosceles triangle.

As shown in FIG. 14, a coordinate position A defined by the stored values Vxi and Vyi which correspond to $\theta_{Gi}$ and a coordinate position B defined by the stored values Vxl and Vyl which correspond to $\theta_{Gl}$, are set on a VX-VY coordinate plane. Then, the preliminary center position PC (Vxo, Vyo) is derived such that the preliminary center position PC is distanced by R1 from the respective coordinate positions A and B and an angle between two lines connecting the preliminary center position PC and the respective coordinate positions A and B is $\Delta\theta_G$.

This is equivalent to deriving the preliminary center position PC (Vxo, Vyo) based on an equation which is shown at a subsequent step 330. Acccordingly, by executing the step 330, the preliminary center position PC is derived.

The details of the so-called method of isosceles triangle described above is disclosed in Japanese First Utility Model Publication No. 1-117712 published on Aug. 9, 1989, which is incorporated by reference for the sake of disclosure.

Now, reliability or accuracy of the preliminary center coordinate position PC derived at the step 112 or 114 will be derived through subsequent steps 116 to 126.

Figure 15A:
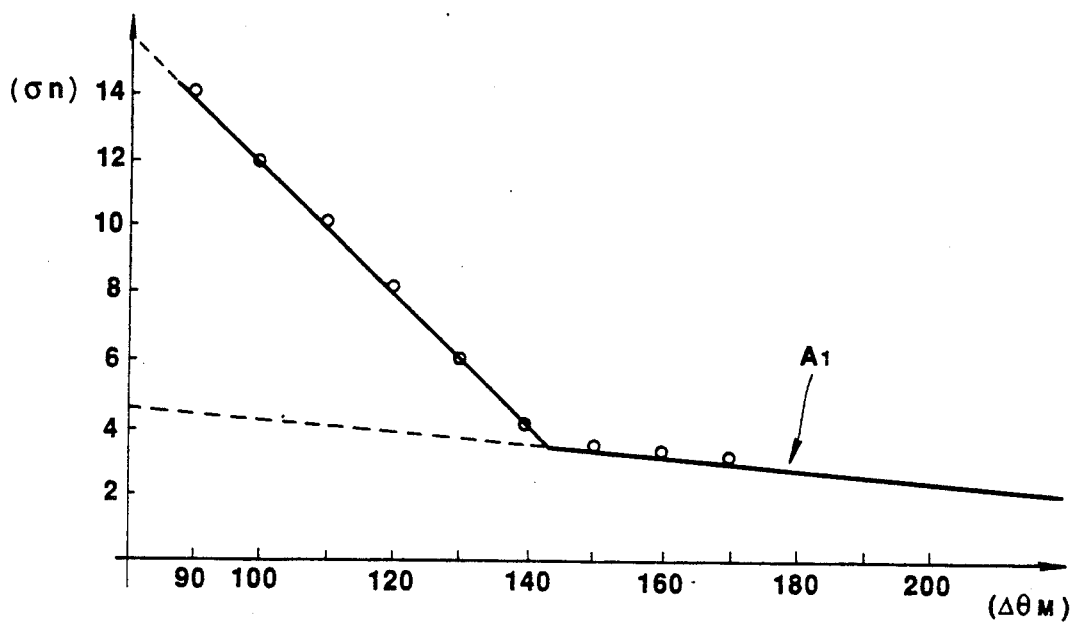
FIG. 15(A) is a graph of standard deviation versus directional variation of the vehicle, which is applicable to a range of the directional variation no less than 90°.
Figure 15B:
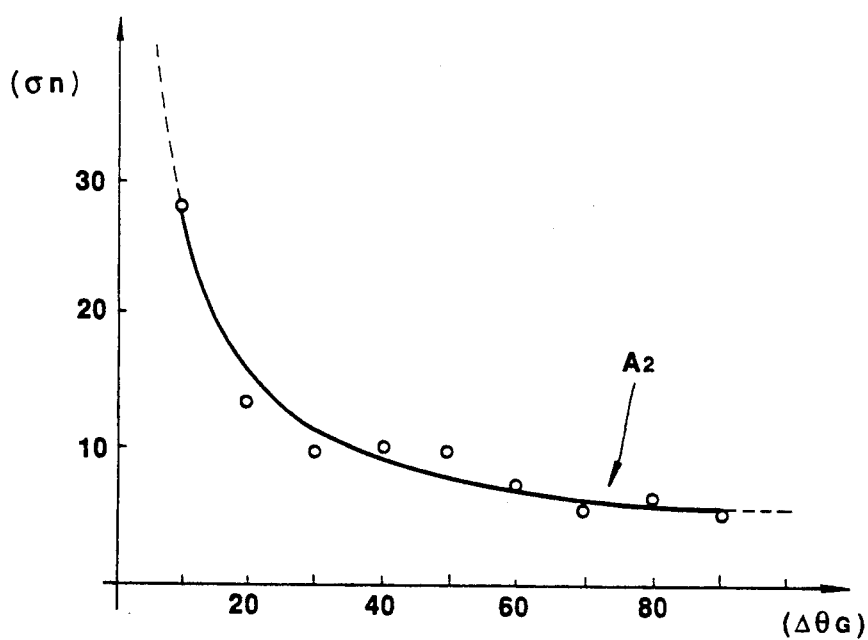
FIG. 15(B) is a graph of standard deviation versus directional variation of the vehicle, which is applicable to a range of the directional variation from no less than 20° to less than 90°.

At first, reference is made to FIGS. 15(A) and 15(B) which respectively show standard deviation versus directional variation graphs. Specifically, FIG. 15(A) shows a standard deviation value δn of the preliminary center coordinate position PC derived at the step 112 with respect to each of predetermined directional variations $\Delta\theta_M$ which will be described later at the step 116 in FIG. 11. Accordingly, the standard deviation value δn is fixedly determined or identified based on the derived directional variation $\Delta\theta_M$. Each of small circles plotted in the graph of FIG. 15(A) shows an actual measured value of the standard deviation of the preliminary center position PC with respect to a corresponding directional variation $\Delta\theta_M$. The actual value identified by each of the small circles has been obtained for each of the predetermined directional variation values $\Delta\theta_M$ through various simulation tests including variations in magnetization level on the vehicle body. A line A1 which is derived on the basis of the plotted actual values, is only applicable to a directional variation range of no less than 90°, and is stored in advance in the control unit 13 (store means 7) in the form of equations which will be described later.

Similarly, FIG. 15(B) shows a standard deviation value δn of the preliminary center coordinate position PC derived at the step 114 with respect to each of predetermined directional variations $\Delta\theta_G$ derived at the step 104. Accordingly, the standard deviation value δn is fixedly determined or identified based on the derived directional variation $\Delta\theta_G$. Each of small circles plotted in the graph of FIG. 15(B) shows an actual measured value of the standard deviation of the preliminary center position PC with respect to a corresponding directional variation $\Delta\theta_G$. The actual value identified by each of the small circles has been obtained for each of the predetermined directional variation values $\Delta\theta_G$ through various simulation tests including variations in magnetization level on the vehicle body. A line A2 which is derived on the basis of the plotted actual values, is only applicable to a directional variation range of $20° \leq \Delta\theta_G < 90°$, and is stored in advance in the control unit 13 (store means 7) in the form of an equation which will be described later.

Referring back to FIG. 11, after the preliminary center coordinate position PC is derived at the step 112, the routine proceeds to the step 116 where the directional variation $\Delta\theta_M$ is derived based on Vxi, Vyi and Vxl, Vyl using the preliminary center coordinate positon PC derived at the step 112 as a center of the output circle. The basis for using the direction variation $\Delta\theta_M$ in place of $\Delta\theta_G$ when $\Delta\theta_G$ is determined no less than 90° at the step 110, is that in case of $\Delta\theta_G$ being large, a measurement error included in $\Delta\theta_G$ due to the gyro sensor dhift may amount to an extent which can not be ignored so that the directional variation $\Delta\theta_M$ derived using the preliminary center position PC as the center of the output circle is more reliable.

Subsequently, at the step 118, it is decided whether $\Delta\theta_M$ derived at the step 116 is no less than a predetermined value of 143°. This value is determined based on the line A1 in FIG. 15(A). Specifically, as clearly seen from FIG. 15(A), the line A1 changes its inclination angle around the direction variation of 143°.

If a decision at the step 118 is YES, i.e. the directional variation $\Delta\theta_M$ is no less than 143°, the routine goes to the step 120 where the standard deviation $\delta n$ of the preliminary center coordinate position PC derived at the step 112 is derived based on the following equation (11) which is derived based on the line A1 in FIG. 15(A) and stored in the control unit 13 (store means 7).

$$\delta n = -0.02\Delta\theta_M + 6.3. \tag{11}$$

On the other hand, if the decision at the step 118 is NO, i.e. the directional variation $\Delta\theta_M$ is less than 143°, then the routine proceeds to the step 122 where the standard deviation $\delta n$ is derived based on the following equation (12) which is derived based on the line A1 in FIG. 15(A) and stored in the control unit 13 (store means 7).

$$\delta n = -0.2\Delta\theta_M + 32 \tag{12}$$

On the other hand, after the preliminary center coordinate position PC is derived at the step 114, the routine goes to the step 124 where the standard deviation $\delta n$ of the preliminary center position PC derived at the step 114 is derived based on the following equation (13) which is derived based on the line A2 in FIG. 15(B) and stored in the control unit 13 (store means 7).

$$\delta n = 250/\Delta\theta_G + 3$$

In the equation (13), since $\Delta\theta_G$ is no less than 20°, but less than 90°, the measurement error of the directional variation due to the gyro sensor drift is considered to be small enough to be ignored so that $\Delta\theta_G$ derived at the step 104 is used for calculation of the standard deviation $\delta n$.

In is to be appreciated that the standard deviation $\delta n$ indicates a degree of scattering of the preliminary center coordinate position PC with respect to a corresponding directional variation both in FIGS. 15(A) and 15(B). Accordingly, the preliminary center coordinate position PC is more reliable when the derived standard deviation $\delta n$ is smaller.

After the standard deviation $\delta n$ is derived at the step 120, 122 or 124, the routine goes to the step 126 where a correction value Kn is derived based on an equation $Kn = 1/\delta n$, which is an inverse number of $\delta n$. Accordingly, the preliminary center coordinate position PC is more reliable when the derived correction value Kn is larger.

It is to be appreciated that the power of the inverse number $1/\delta n$ may also be used as the correction value Kn.

Now, the routine goes to a step 128 where a new or corrected center coordinate position NC (Vxcn, Vycn) is derived based on the following equations (14) and (15).

$$Vxcn = \frac{KcVxc + KnVxo}{Kc + Kn} \tag{14}$$

$$Vycn = \frac{KcVcy + KnVyo}{Kc + Kn} \tag{15}$$

wherein, Vxc and Vyc are X and Y coordinate values, respectively, of a center coordinate position OC (Vxc, Vyc) derived at the step 128 as Vxcn and Vycn in a prior execution of this correction routine, Vxo and Vyo are X and Y coordinate vaues, respectively, of the preliminary center coordinate position PC derived at the step 112 or 114, Kc is a correction value indicative of reliability for the center coordinate position OC (Vxc, Vyc) derived at the subsequent step 130 as Kcn in the prior execution of this correction routine, and Kn is a correction value indicative of reliability for the preliminary center coordinate position PC (Vxo, Vyo) derived at the step 126.

As appreciated from the above equations (14) and (15), the new center coordinate position NC (Vxcn, Vycn) approaches closer to the preliminary center coordinate position PC (Vxo, Vyo) when the value Kn is larger, i.e. the reliability of the preliminary center position PC is larger. In other words, the value Kn determines a point of the new center position NC between the center coordinate position OC (Vxc, Vyc) and the preliminary center position PC (Vxo, Vyo).

The new center coordinate position NC (Vxcn, Vycn) is fed to an interrupt routine (corresponding to the direction deriving means 8 in FIG. 1) which is executed per a predetermined unit time for deriving a traveling diection $\theta$ of the vehicle based on the following equation (16).

$$\theta = \tan^{-1} \frac{Vy - Vycn}{Vx - Vxcn} \tag{16}$$

wherein, Vx and Vy are X and Y coordinate values sequentially fed from the geomagnetic direction sensor 2 through the output process means 4, and Vxcn and Vycn are X and Y coordinate values of the new center coordinate positon NC derived at the step 128.

The new center coordinate position NC (Vxcn, Vycn) is stored to be used at the step 128 as Vxc and Vyc in a next execution of this correction routine.

Subsequently, the routine goes to the step 130. Since the additivity for variance of the standard deviation $\delta n$ is ensured according to the additivity of the normal distribution, a standard deviation $\delta cn$ for the new center coordinate position (Vxcn, Vycn) is derived based on the following equation (17).

$$\delta cn = \sqrt{\frac{Kc \times \delta c^2 + Kn \times \delta n^2}{Kc + Kn}} \quad (17)$$

Wherein, Kc is a correction value indicative of reliability of the center coordinate position OC (Vxc, Vyc) derived at the step 130 as Kcn in the prior execution of this correction routine, δc is a standard deviation of the center coordinate position OC (Vxc, Vyc) derived at the step 130 as δcn in the prior execution of this correction routine, Kn is a correction value indicative of reliability for the preliminary center coordinate position PC derived at the step 126, and δn is a standard deviation derived at the step 120, 122 or 124.

Further, at the step 130, the value Kcn which is a correction value indicative of reliability for the new center coordinate position NC (Vxcn, Vycn) is derived based on an equation Kcn=1/δcn. The standard deviation δcn is stored to be used at the step 130 as δc in the next execution of this correction routine. Similarly, the correction value Kcn is stored to be used at the steps 128 and 130 as Kc in the next execution of this correction routine.

It is to be appreciated that the data (Vx, Vy, $\theta_G$) stored at the step 100 are erased at a predetermined timing for sequentially storing new data from the geomagnetic direction sensor 2 and the gyro sensor 10 at the step 100 in the next execution of this correction routine.

As appreciated from the above description, the vehicular traveling direction measuring system according to the preferred embodiment utilizes a correction value indicative of reliability of a preliminary center coordinate position PC for deriving a corrected center coordinate position NC. The reliability of PC has been obtained in advance for each of predetermined directional variation values through various simulation tests including variations in magnetization level on the vehicle body, and is accessible using the derived directional variation $\Delta\theta_G$ or $\Delta\theta_M$.

Accordingly, when the directional variation $\Delta\theta_G$ or $\Delta\theta_M$ is derived, the corrected center coordinate position NC can be derived with high accuracy using the correction value indicative of the reliability of PC derived in terms of the derived $\Delta\theta_G$ or $\Delta\theta_M$, regardless of variations in magnetization level on the vehicle body.

Further, since a corrected center coordinate position NC is sequentially used in subsequent executions of the correction routine for sequentially deriving a newly corrected center coordinate position NC, the measurement accuracy of the center coordinate position NC becomes higher as the execution of the correction routine is repeated.

It is to be understood that this invention is not to be limited to the preferred embodiment described above, and that various changes and modifications may be made without departing from the spirit and scope of the invention as defined in the appended claims.

What is claimed is:

1. A system for measuring a traveling direction of a vehicle comprising:
   a geomagnetic sensor, mounted to the vehicle, which is operable to sequentially derive a set of data relating to the geomagnetism around the vehicle, said data having components in two directions which are orthogonal to each other on a horizontal plane to define a first coordinate position by each set of said two directional component data; and
   a control circuit operatively connected to said geomagnetic sensor, said control circuit including:
   first means for deriving a variation in a traveling direction of the vehicle;
   second means for deriving a second coordinate position of a center of a corresponding output circle based on said first coordinate positions;
   third means for deriving a correction value indicative of reliability of said second center coordinate position using said derived directional variation as a parameter;
   fourth means for deriving a third coordinate position as a correction value of said second center coordinate position based on said second center coordinate position and said reliability indicative correction value such that said third center coordinate position is determined to be closer to said second center coordiante position when said reliability indicative correction value derived by said third means increases;
   fifth means for deriving a traveling direction of the vehicle based on a direction from said third center coordinate position toward said first coordinate position defined by an instantaneous set of the two directional component data.

2. The system as set forth in claim 1, wherein said third means derives said reliability indicative correction value based on an equation using said directional variation derived by said first means as the parameter.

3. The system as set forth in claim 1, wherein said reliability is in the form of a degree of scattering of said second center coordinate position with respect to said derived directional variation, and said reliability indicative correction value is derived as an inverse value of said degree of scattering.

4. The system as set forth in claim 3, wherein said reliability is in the form of a standard deviation of said second center coordinate position with respect to said derived directional variation, and said reliability indicative correction value is derived as an inverse value of said standard deviation.

5. A system for measuring a traveling direction of a vehicle comprising:
   a geomagnetic sensor, mounted to the vehicle, which is operable to sequentially derive data relating to the geomagnetism around the vehicle, said data having components in two directions which are orthogonal to each other on a horizontal plane; and
   a control circuit operatively connected to said geomagnetic sensor, said control circuit including:
   first means for deriving a traveling direction of the vehicle based on a direction toward a coordinate position defined by said two directional component data from a first coordinate position of a center of a corresponding output circle;
   second means for deriving a variation in a traveling direction of the vehicle;
   third means for deriving a second coordinate position as a preliminary corrected value of said first coordinate position based on said sequentially derived two directional component data;
   fourth means for deriving a correction value indicative of reliability of said second center coordinate position using said derived directional variation as a parameter;

fifth means for deriving a third coordinate position as a finally corrected value of said first coordinate position based on said second coordinate position and a latest value of said third coordinate position, said latest value derived in a prior execution of said fifth means, by using said reliability indicative correction value such that said reliability indicative correction value determines a point of said third coordinate position between said latest value and said second coordinate position.

6. A system for measuring a traveling direction of a vehicle comprising:

a geomagnetic sensor, mounted to the vehicle, which is operable to sequentially derive a set of data relating to the geomagnetism around the vehicle, said data having components in two directions which are orthogonal to each other on a horizontal plane to define a first coordinate position by each set of said two directional component data; and a control circuit operatively connected to said geomagnetic sensor, said control circuit including:

first means for deriving a first variation in a traveling direction of the vehicle based on data output from a non-geomagnetic direction sensor, said non-geomagnetic direction sensor outputting said data without being affected by the geomagnetism around the vehicle;

second means for deriving a second coordinate position of a center of a corresponding output circle based on said first coordinate positions when said first directional variation is no less than a first predetermined value;

third means for deriving a third coordinate position of a center of a corresponding output circle based on said first coordinate positions and said first directional variation when said first directional variation is less than said first predetermined value;

fourth means for deriving a second variation in a traveling direction of the vehicle based on said first coordinate positions;

store means for storing first and second preset data, said first preset data including first reliability data of said second center coordinate position, said first reliability data being accessible by using said second directional variation derived by said fourth means, and said preset data including second reliability data of said third center coordinate position, said second reliability data being accessible by using said first directional variation derived by said first means;

fifth means for deriving a first correction value based on said first preset data by using said second directional variation, said first correction value indicative of said first reliability data of said second center coordinate position;

sixth means for deriving a second correction value based on said second preset data by using said first directional variation, said second correction value indicative of said second reliability data of said third center coordinate position;

seventh means for deriving a fourth coordinate position as a correction value of said second or third center coordinate position based on said second or third center coordinate position and said first or second reliability indicative correction value, respectively, such that said fourth center coordinate position is determined to be closer to said second or third center coordinate position when said corresponding first or second reliability indicative correction value derived by said fifth or sixth means increases;

eighth means for deriving a traveling direction of the vehicle based on a direction from said fourth center coordinate position toward said first coordinate position defined by an instantaneous set of the two directional component data.

7. The system as set forth in claim 6, wherein said first reliability data is in the form of a degree of scattering of said second center coordinate position with respect to said second directional variation and said first correction value is derived as an inverse value of said first degree of scattering, and said second reliability data is in the form of a second degree of scattering of said third center coordinate position with respect to said first directional variation and said second correction value is derived as an inverse value of said second degree of scattering.

8. The system as set forth in claim 7, wherein said first reliability data is in the form of a first standard deviation of said second center coordinate position with respect to said second directional variation and said first correction value is derived as an inverse value of said first standard deviation, and said second reliability data is in the form of a second standard deviation of said third center coordinate position with respect to said first directional variation and said second correction vaue is derived as an inverse value of said second standard deviation.

9. The system as set forth in claim 8, wherein said first preset data are first and second equations, and said first standard deviation is derived based on said first equation when said second directional variation is less than a second predetermined value and based on said second equation when said second directional variation is no less than said second predetermined value.

10. The system as set forth in claim 9, wherein said first equation is:

$$\delta n = -0.2\Delta\theta_M + 32$$

wherein, $\delta n$ is the first standard deviation and $\Delta\theta_M$ is the second derived directional variation, and wherein said second equation is:

$$\delta n = -0.02\Delta\theta_M + 6.3$$

wherein, $\delta n$ is the first standard deviation and $\Delta\theta_M$ is the second derived directional variation.

11. The system as set forth in claim 8, wherein said second preset data is a following equation and said second standard deviation is derived based on said equation:

$$\delta n = 250/\Delta\theta_G + 3$$

wherein, $\delta n$ is the second standard deviation and $\Delta\theta_G$ is the first derived directional variation.

12. The system as set forth in claim 8, further comprising ninth means for deriving a third standard deviation for said fourth center coordinate position based on said first or second correction value and said corresponding first or second standard deviation, and tenth means for deriving a third value which is an inverse value of said third standard deviation.

13. The system as set forth in claim 12, wherein said seventh means derives said fourth center coordinate position based on a following equation:

$$Vxcn = \frac{KcVxc + KnVxo}{Kc + Kn}$$

$$Vycn = \frac{KcVcy + KnVyo}{Kc + Kn}$$

wherein, Vxcn and Vycn are X and Y coordinate values, respectively, of said fourth center coordinate position, Vxc and Vyc are X and Y coordinate values, respectively, of said fourth center coordinate position derived in a prior execution of said seventh means, Kc is said third value derived in the prior execution of said tenth means and is indicative of reliability of said fourth center coordinate position (Vxc, Vyc), Vxo and Vyo are X and Y coordinate values, respectively, of said second or third center coordinate position, and Kn is said first or second correction value derived by said fifth or sixth means, respectively.

14. The system as set forth in claim 13, wherein said third standard deviation is derived based on a following equation:

$$\delta cn = \sqrt{\frac{Kc \times \delta c^2 + Kn \times \delta n^2}{Kc + Kn}}$$

wherein, $\delta cn$ is the third standard deviation, $\delta c$ is the third standard deviation derived in the prior execution of said ninth means, and $\delta n$ is the first or second standard deviation.

15. The system as set forth in claim 6, wherein said third means derives said third center coordinate position only when said first directional variation is no less than a third predetermined value, said third predetermined value being less than said first predetermined value.

16. The system as set forth in claim 6, wherein said non-geomagnetic direction sensor is a gyro sensor.

* * * * *